United States Patent
Enokida et al.

(10) Patent No.: US 6,947,926 B2
(45) Date of Patent: Sep. 20, 2005

(54) DATA PROCESSING METHOD AND APPARATUS AND STORAGE MEDIUM

(75) Inventors: Miyuki Enokida, Kanagawa (JP); Kunihiro Yamamoto, Kanagawa (JP); Kiyoshi Kusama, Tokyo (JP); Takashi Hanamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 431 days.

(21) Appl. No.: 10/176,631

(22) Filed: Jun. 24, 2002

(65) Prior Publication Data

US 2003/0004976 A1 Jan. 2, 2003

(30) Foreign Application Priority Data

Jun. 27, 2001 (JP) .......................................... 2001-195385

(51) Int. Cl.$^7$ ............................................ G06F 17/30
(52) U.S. Cl. .............................. 707/3; 707/10; 707/102
(58) Field of Search ........................... 707/1, 3, 10, 102

(56) References Cited

U.S. PATENT DOCUMENTS 5,574,907 A * 11/1996 Jernigan et al. ................ 707/1
6,463,444 B1 * 10/2002 Jain et al. ................ 707/104.1
6,678,700 B1 * 1/2004 Moore et al. ................ 707/200
2001/0031066 A1 * 10/2001 Meyer et al. ................ 382/100
2002/0099696 A1 * 7/2002 Prince ............................ 707/3
2002/0107850 A1 * 8/2002 Sugimoto et al. .............. 707/3

* cited by examiner

*Primary Examiner*—Alford W. Kindred
*Assistant Examiner*—CamLinh Nguyen
(74) *Attorney, Agent, or Firm*—Fitzpatrick, Cella, Harper & Scinto (57) ABSTRACT

A data processing apparatus in which attachment of removable memory card is detected and it is determined whether or not binary data is stored in the memory card. If it is determined that binary data is stored in the memory card, it is further determined whether or not meta data is stored in the memory card. If it is determined that the meta data is stored, the meta data is added to the binary data. If it is determined that no meta data is stored, meta data registration processing is started, and addition processing is performed after registration of the meta data. On the other hand, if it is determined that no binary data is stored, the registration processing is started to register the meta data in the memory card.

9 Claims, 12 Drawing Sheets

DATA PROCESSING METHOD AND APPARATUS AND STORAGE MEDIUM

FIELD OF THE INVENTION

The present invention relates to data management apparatus and method for registration of meta data in binary data.

BACKGROUND OF THE INVENTION

Meta data is "data on data" which is used as data explaining image data, audio data and the like (these data will be referred to as "binary data"). A keyboard search can be performed on the image data, audio data and the like by adding the meta data to the respective binary data. Accordingly, as more meta data are added to the respective binary data, a search can be conducted with more key words.

Further, input of binary data or registration of meta data from a removable PC card is performed by a user's inputting a corresponding command or designation using GUI or the like.

However, the work to add meta data to binary data is very troublesome for the user. For example, the user must check each binary data for input of meta data. Further, even if the same meta data is to be added to binary data generated on almost the same condition, the same meta data must be repeatedly inputted.

Further, as a method of inputting meta data for respective binary data, proposed is storing meta data of binary data to be obtained onto a removable storage medium such as a memory card, then storing the binary data onto the storage medium, and thereafter, adding the meta data to the respective binary data by a meta data registration device. However, the meta data registration device cannot automatically select one of processing of previously inputting meta data (pre-input processing) from processing of adding the meta data to the binary data (addition processing). Accordingly, it is necessary for the user to select any of the processings from the same menu. Thus, in this conventional art, the operation is complicated and cannot be automated.

As a result, in many cases, meta data is not actually added to binary data.

SUMMARY OF THE INVENTION

The present invention has been made in consideration of the above situation regarding input of meta data, and has its object to facilitate input of meta data.

Further, another object of the present invention is to register meta data for many binary data by inputting meta data only once.

Further, another object of the present invention is to simplify or automate user's operation procedure upon addition of meta data to binary data.

According to the present invention, the foregoing object is attained by providing a data processing apparatus comprising: connection means for connection with a storage medium, removable from the apparatus, so as to enable access to the medium; first determination means for, if the storage medium is accessible by the connection means, determining whether or not binary data is stored in the storage medium; addition means for, if the first determination means determines that the binary data is stored, adding meta data stored in the storage medium to the binary data; and first registration means for, if the first determination means determines that the binary data is not stored, starting registration processing to register the meta data in the storage medium.

According to the another aspect of the present invention, the foregoing object is attained by providing a data processing method in a data processing apparatus having connection means for connection with a storage medium, removable from the apparatus, so as to enable access to the medium, the method comprising: a first determination step of, if the storage medium is accessible by the connection means, determining whether or not binary data is stored in the storage medium; an addition step of, if it is determined at the first determination step that the binary data is stored, adding meta data stored in the storage medium to the binary data; and a first registration step of, if it is determined at the first determination step that the binary data is not stored, starting registration processing to register the meta data in the storage medium.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
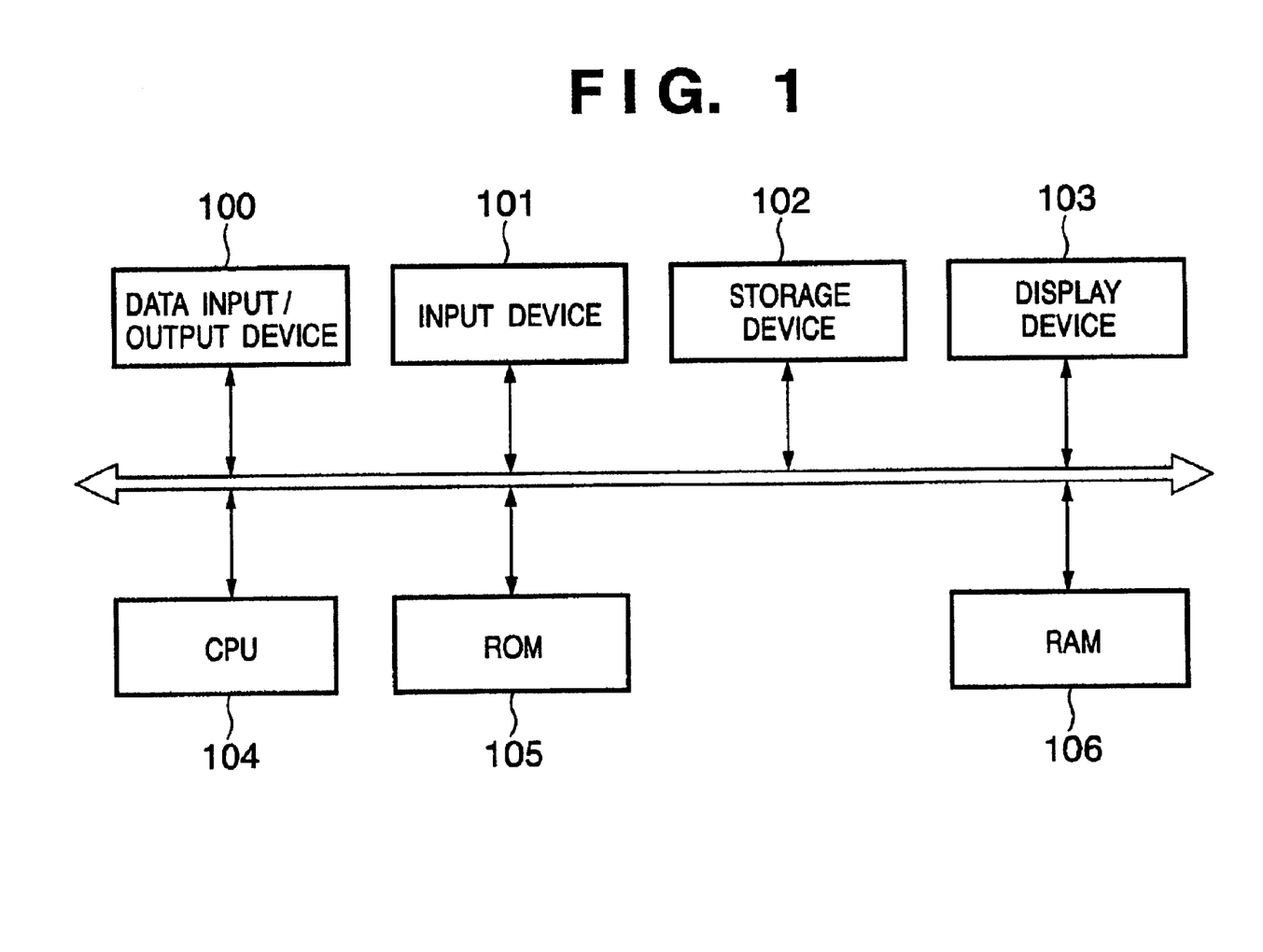
FIG. 1 is a block diagram showing a system configuration of data processing apparatus according to an embodiment of the present invention.

FIG. 1 is a block diagram showing the system configuration of data processing apparatus according to an embodiment of the present invention. In FIG. 1, a data input/output device 100 reads image data or the like obtained by a digital camera or the like, from a memory card, a PC card or the like, via an interface such as USB, otherwise, writes meta data onto the memory card, the PC card or the like by a procedure to be described later. Note that in the present embodiment, binary data of image or the like is not written onto the memory card (it may be arranged such that the binary data is written onto the memory card).

An input device 101, including pointing devices such as a keyboard and a mouse, inputs a user's designation or data. A storage device 102 which is a hard disk or the like holds the binary data and the meta data. A display device 103, which is generally a CRT or a liquid crystal display, displays GUI or an image.

Numeral 104 denotes a CPU which relates to all the processing of the above-described constituent elements. ROM 105 and RAM 106 provide a program, data, a working area and the like necessary for each processing to the CPU 104. Further, a control program necessary for processing in the flowcharts in FIG. 4 and the subsequent figures is stored in the storage device 102 or in the ROM 105. Note that if the control program is stored in the storage device 102, it is read to the RAM 106, then executed by the CPU 104.

Note that in the system configuration, various constituent elements other than the above elements exist, however, since they are not significant in the invention, explanations of those elements will be omitted.

Figure 2:
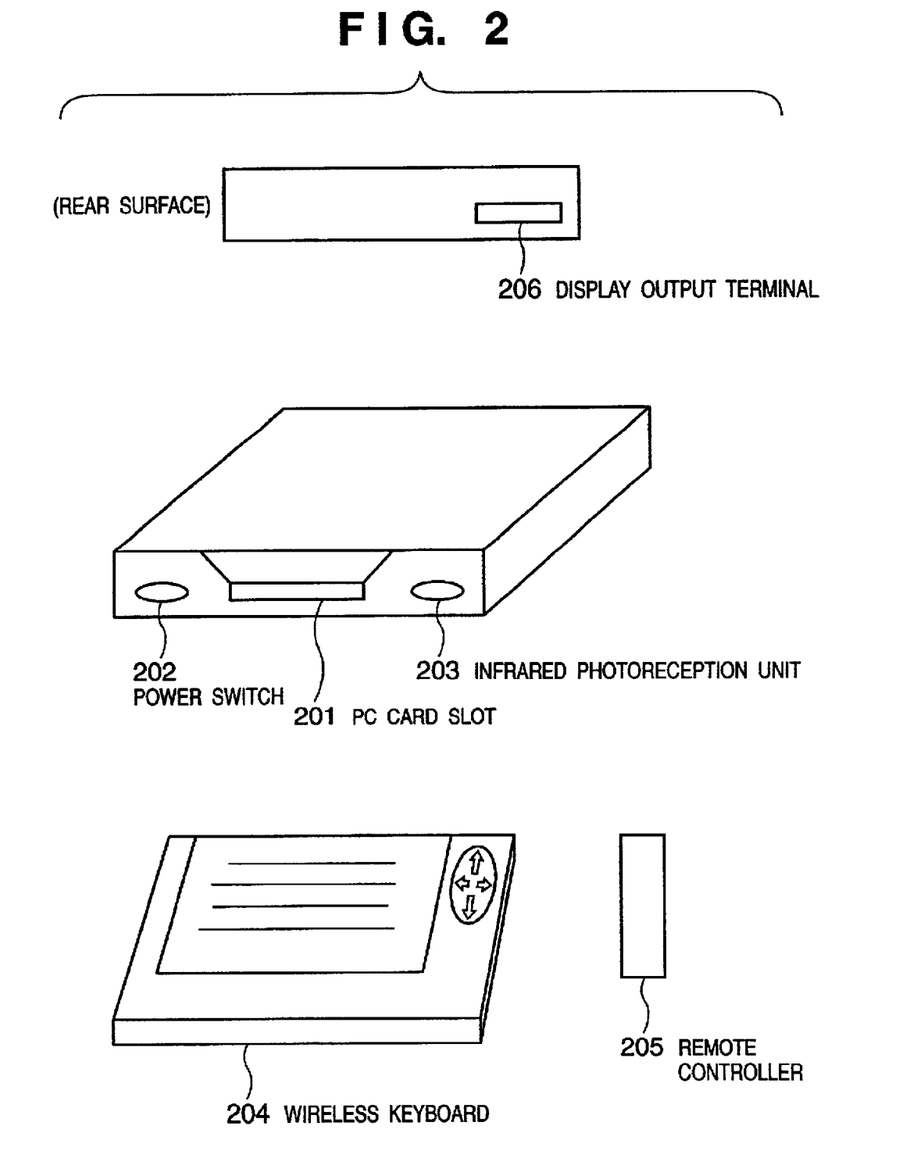
FIG. 2 is a perspective view showing the outer appearance of the data processing apparatus according to the embodiment.

FIG. 2 is a perspective view showing the outer appearance of the data processing apparatus according to the embodiment. As shown in FIG. 2, a PC card slot 201 as the data input/output device 100 is incorporated in a front surface of the apparatus, and binary data is read via a PC card. A power switch 202 is used for ON/OFF operation of power supply to the data processing apparatus. An infrared photoreception unit 203 receives a signal from a wireless keyboard 204 and a remote controller 205. The wireless keyboard 204 and the remote controller 205 are respectively used as the input device 101. A display output terminal 206 is provided on a rear surface of the apparatus. The display device 103 such as a CRT or a liquid crystal display is connected to the display output terminal 206. Further, other terminals such as a USB terminal for connection to a digital camera or the like and a network connection terminal for connection to a network may be provided there.

Next, a meta data generation method in the data processing apparatus of the present embodiment having the above construction will be described.

Figure 3:
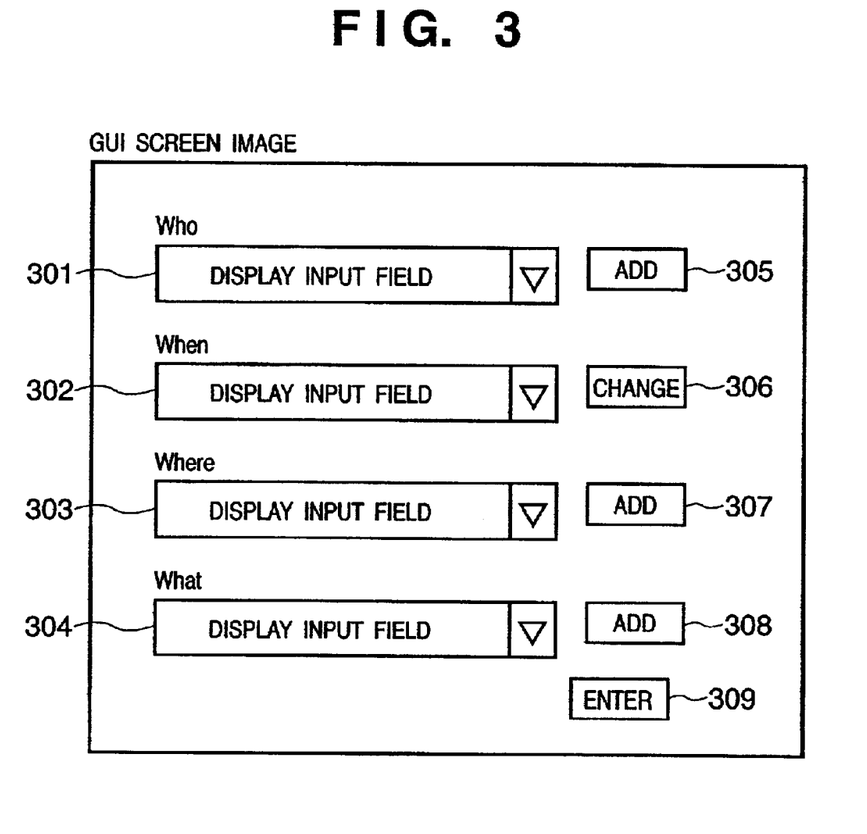
FIG. 3 is an example of GUI screen image in meta data input processing.

FIG. 3 is an example of GUI screen image in meta data input processing. In display input fields 301 to 304, display and selection of list, and text input can be made. In the present embodiment, in the display input field 301 corresponding to a "who" item, a personal name or the like is displayed, selected or inputted. In the display input field 302 corresponding to a "when" item, a date is displayed or inputted. In the display field 303 corresponding to a "where" item, the place of image sensing or the like is displayed, selected or inputted. In the display input field 304 corresponding to a "what" item, an event or the like is displayed, selected or inputted. Further, "add" buttons 305, 307 and 308 are buttons to add items inputted in the display input fields 301, 303 and 304 (inputted from the keyboard) to the lists. A "change" button 306 is a button to change the date. The date inputted in the display input field 302 can be changed by using the button 306.

Figure 4:
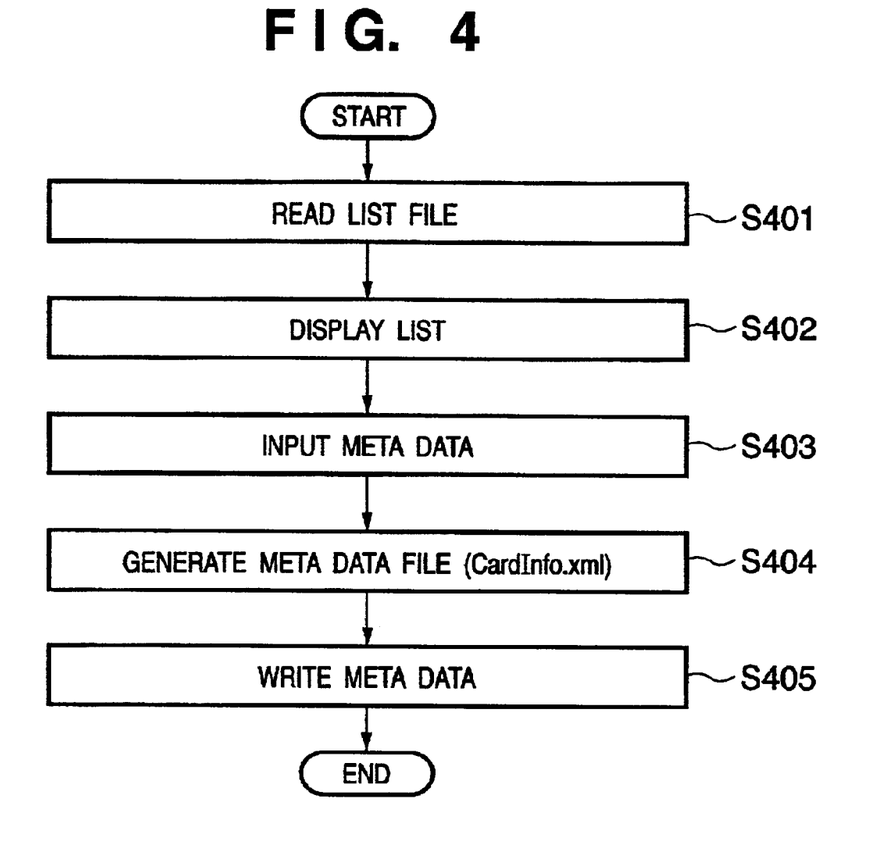
FIG. 4 is a flowchart showing processing of registering meta data in a memory card.

FIG. 4 is a flowchart showing processing of registering meta data on the memory card. First, at step S401, a list file where the respective "who", "when", "where" and "what" lists are registered is read onto the RAM 106 in FIG. 1. Next, at step S402, the read lists are displayed in the display input fields 301 to 304 in FIG. 3.

Next, at step S403, the user inputs meta data about "who", "when", "where" and "what" into the display input fields 301 to 304 in FIG. 3. Note that the input method will be described in detail later with reference to FIG. 5. At step S404, when the "enter" button 309 in FIG. 3 is depressed, a meta data file (CardInfo.xml) is generated by using a data description language such as XML from the input meta data. then at step S405, the meta data file generated at step S404 is written onto the memory card via the data input/output device 100. Note that the writing to the memory card will be described in detail later with reference to FIG. 6.

Figure 5:
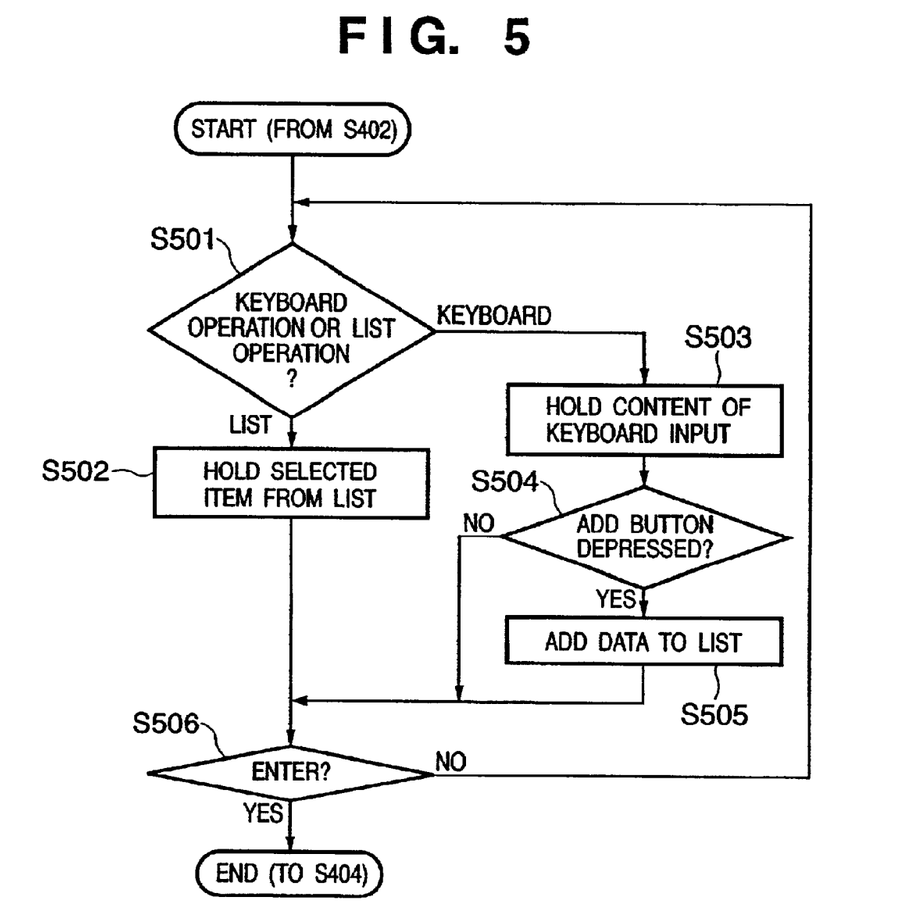
FIG. 5 is a flowchart showing the meta data input processing at step S403 in FIG. 4.

FIG. 5 is a flowchart showing the meta data input processing at step S403 in FIG. 4. First, at step S501, it is determined whether the operation to the display input fields 301 to 304 has been a list operation (operation to inverted delta symbols of the display input fields 301 to 304) or an input operation from the keyboard. If it is determined that the operation has been the list operation, the process proceeds to step S502, at which a pull-down list is displayed. Then one of the items of the pull-down list selected by the user is temporarily stored as an input content to the display input field.

If a desired item is not found in the displayed pull-down list, a character string is inputted from the keyboard (keyboard operation). If the keyboard operation has been operated, the process proceeds to step S503, at which the content of the input by the keyboard operation is displayed in an active one of the display input fields 301 to 304, and it is held as a setting to the corresponding to the display input field.

Then, it is determined whether or not any of the "add" buttons 305, 307 and 308 has been depressed. If it is determined that any one of the buttons has been depressed, the process proceeds from step S504 to step S505. At step S505, the data inputted in the display input field corresponding to the "add" button depressed at step S503 is added to the list of the display input field.

When the input regarding the display input fields 301 to 304 has been completed, the user depresses the "enter" button 309 to complete the input of meta data. At step S506, it is determined whether or not the "enter" button 309 has been depressed. If it is determined that the "enter" button 309 has been depressed, the processing (at step S403) is terminated, and the process proceeds to step S404 in FIG. 4. As described above, a meta data file (CardInfo.xml) is generated by using a data description language such as XML from the content of input held in correspondence with the respective display input fields by the above processing. On the other hand, if it is determined that the "enter" button 309 has not been depressed, the process returns to step S501 to repeat the above processing.

Note that in the above example, the keyboard is used as the input device at step S503, however, other various input methods such as input from G code, voice input and input via network are applicable.

Figure 6:
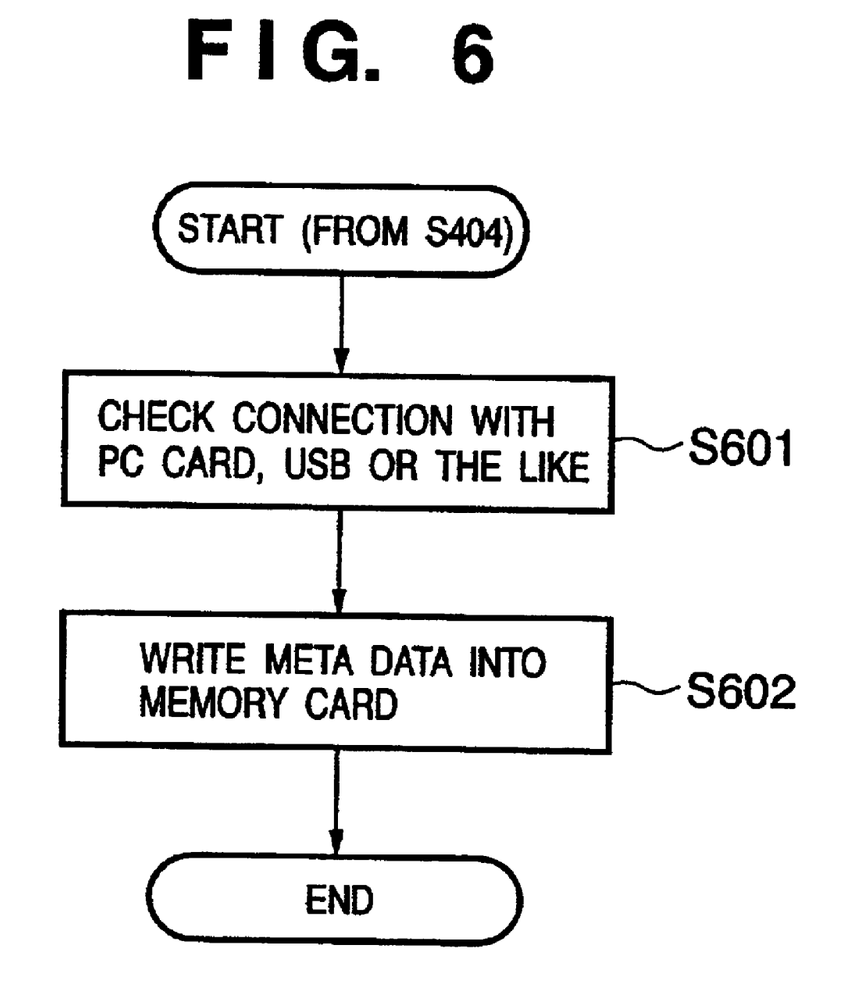
FIG. 6 is a flowchart showing writing of the meta data onto the memory card at step S405 in FIG. 4.

FIG. 6 is a flowchart showing writing of the meta data onto the memory card at step S405 in FIG. 4. At step S601, it is determined whether or not a storage medium as a writing destination for the meta data is connected to the data input/output device 100. For example, it is checked whether or not a PC card is attached, or the device is connected to a memory card of digital camera via USB. If it is determined that the storage medium is connected to the data input/output device 100, the process proceeds to step S602 at which the meta data file generated at step S404 in FIG. 4 is written into the memory card.

When the processing in FIG. 6 has been completed, the meta data writing processing according to the present embodiment ends. In this embodiment, the connection between the input/output device 100 and the memory card is made by merely using the PC card or the memory card of digital camera via USB, however, any other connection may be employed such as connection using a serial port as long as it enables access to the memory card.

Next, processing to add generated meta data to binary data will be described. In the present embodiment, still image data is handled as binary data.

Figure 7:
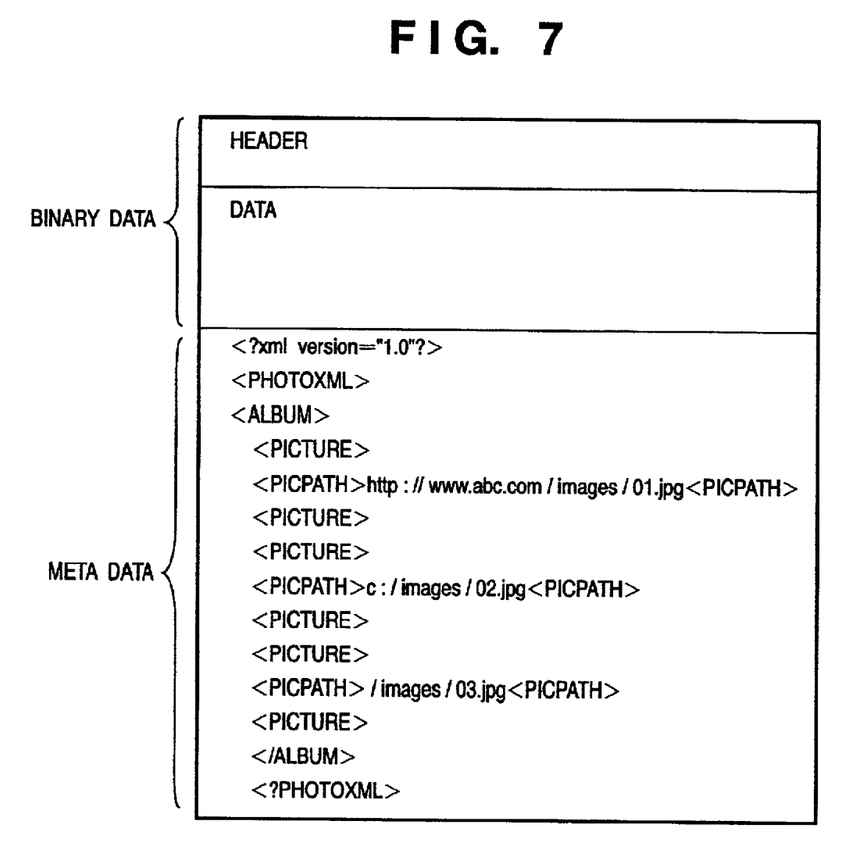
FIG. 7 is a schematic diagram showing the structure of image data where the meta data is added to the image data.

FIG. 7 is a schematic diagram showing the structure of image data where the meta data is added to the image data. In the present embodiment, binary data with meta data is generated by adding the meta data to the end of the binary data. Accordingly, as shown in FIG. 7, the meta data is added to the end of the image data. Note that in the present embodiment, the image data is used as the binary data, however, audio data, moving image data and the like may be handled as binary data.

Figure 8:
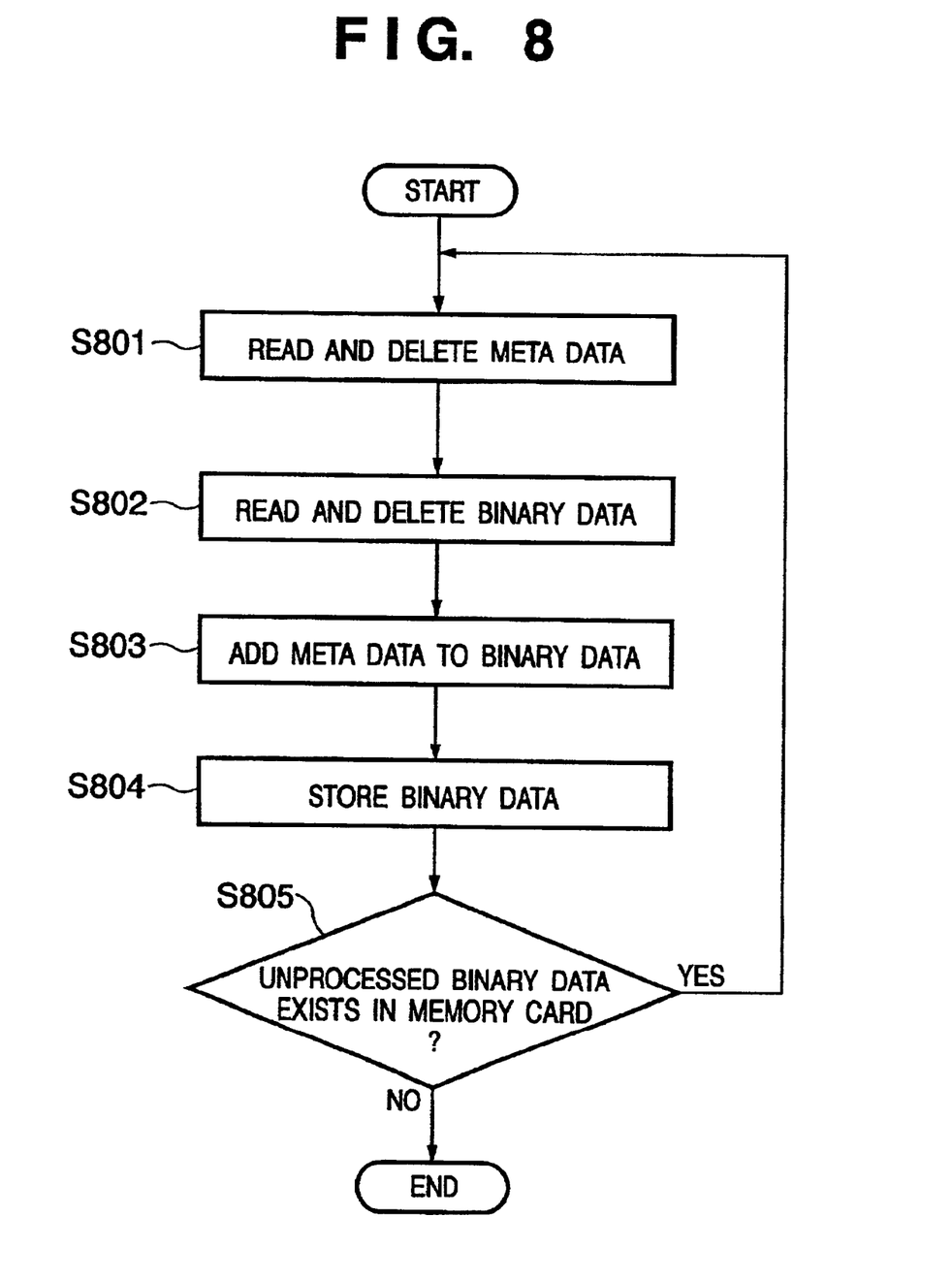
FIG. 8 is a flowchart showing processing upon addition of the meta data to the image data.

FIG. 8 is a flowchart showing processing upon addition of the meta data to the image data. At step S801, the meta data is read from the memory card by using the data input/output device 100 in FIG. 1. In this embodiment, the above-described meta data (CardInfo.xml) written in a data description language such as XML is read from a PC card, or from a storage medium which is connected to the data input/output device 100 via USB or the like (there cards are generally referred to as a "memory card"), and stored onto the RAM 106. Thereafter, the meta data on the memory card is deleted. At step S802, the image data is read from the memory card by using the data input/output device 100, and stored onto the RAM 106. Thereafter the image data is deleted from the memory card.

At step S803, the meta data held in the RAM 106 at step S801 is added to the image data held in the RAM 106 at step S802. When a command of addition is issued from the system, the meta data read at step S801 is added to the end of the image data read at step S802, thus the image data with meta data as shown in FIG. 7 is generated. At step S804, the image data with meta data generated at step S803 is held onto the storage device 102.

At step S805, it is determined whether or not image data which has not been read yet exists on the memory card. If it is determined that all the image data on the memory card has been read, as the addition of meta data to all the image data on the memory card has been completed, the process ends. On the other hand, if it is determined that unread image data remains on the memory card, the process returns to step S802. In this manner, merely by previously inputting meta data, meta data can be simply added to all the images on the memory card.

The registration and addition of meta data are as described above. In the present embodiment, the presence/absence of binary data on the memory card inserted in the PC card slot 201 (memory card connected to the data input/output device 100) is determined, and the above registration and addition of meta data are performed based on the result of determination. Hereinbelow, control of the registration and addition will be described.

Figure 9:
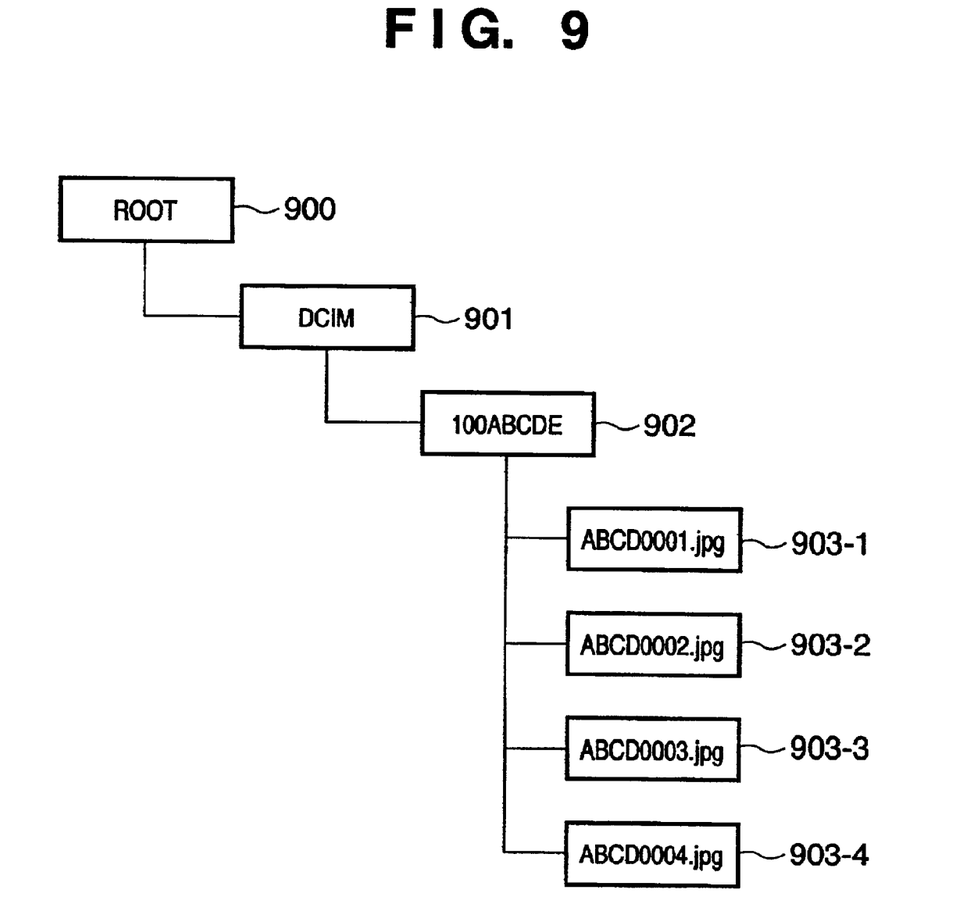
FIG. 9 is a block diagram showing a construction of DCF (Design rule for Camera File System) file format.

First, the data storage format on the memory card according to the present embodiment will be described. Assuming that the binary data held on the memory card inserted in the PC card slot is obtained by image sensing a still image by a digital camera, the file format on the memory card is a camera file system format (Design rule for Camera File System) (DCF file format). FIG. 9 shows an example of directories of the DCF file format. In the figure, numeral 900 denotes a root directory ("ROOT") of the memory card, and a DCF image root directory 901 having a directory name "DCIM" is stored immediately below the root directory 900. Further, a DCF directory 902 for storing a DCF object ("100ABCDE") is stored immediately below the DCF image root directory 901. Plural DCF objects (still image binary data) are stored below the DCF directory 902. In FIG. 9, four still image data 903-1, 903-2, 903-3 and 903-4 are stored.

Figure 10:
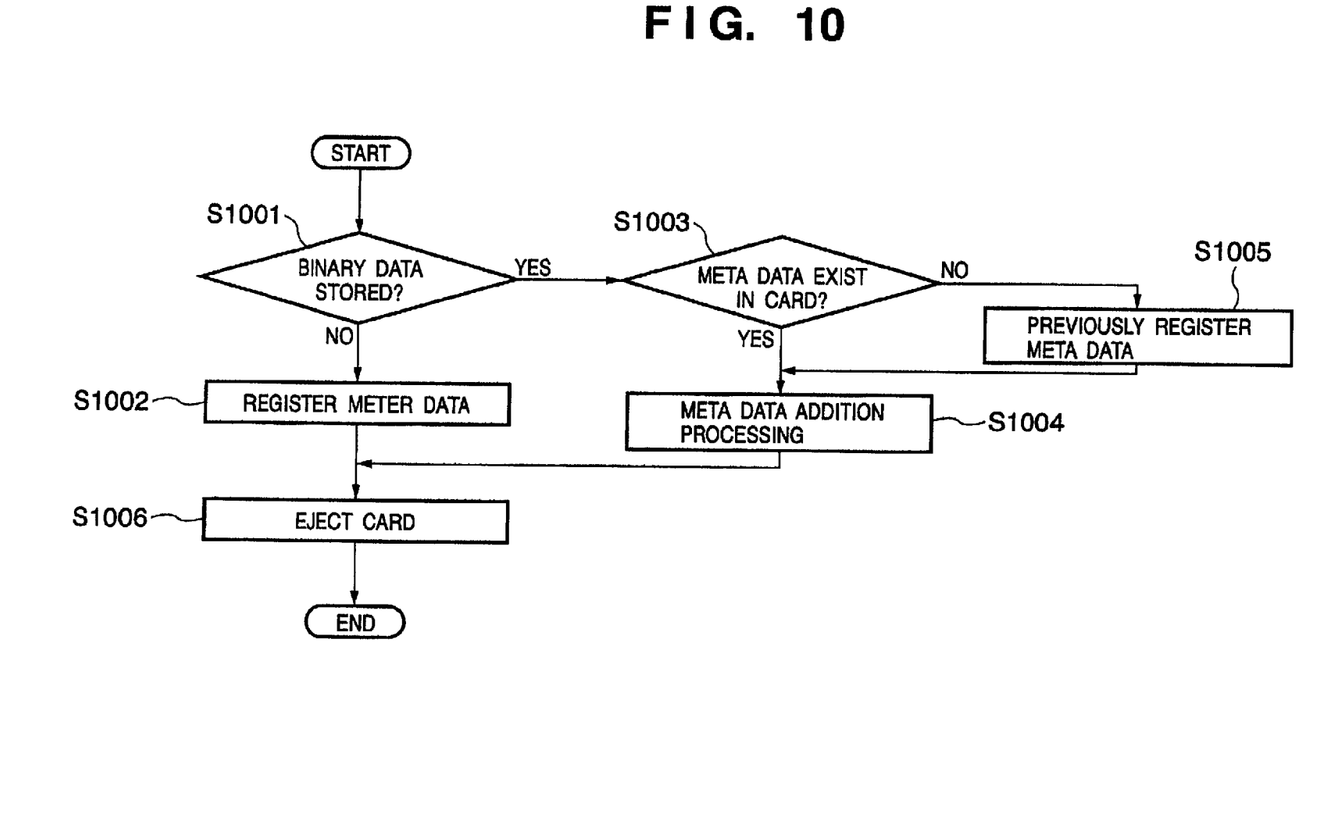
FIG. 10 is a flowchart showing switching processing between registration of meta data and addition of meta data according to the embodiment.

FIG. 10 is a flowchart showing switching processing between the registration of meta data and the addition of meta data according to the present embodiment. When the memory card is attached to the data processing apparatus of the present embodiment (for example, when a PC card is inserted and becomes accessible, or when a memory card in a digital camera becomes accessible via USB), the processing shown in the flowchart is performed.

Figure 11:
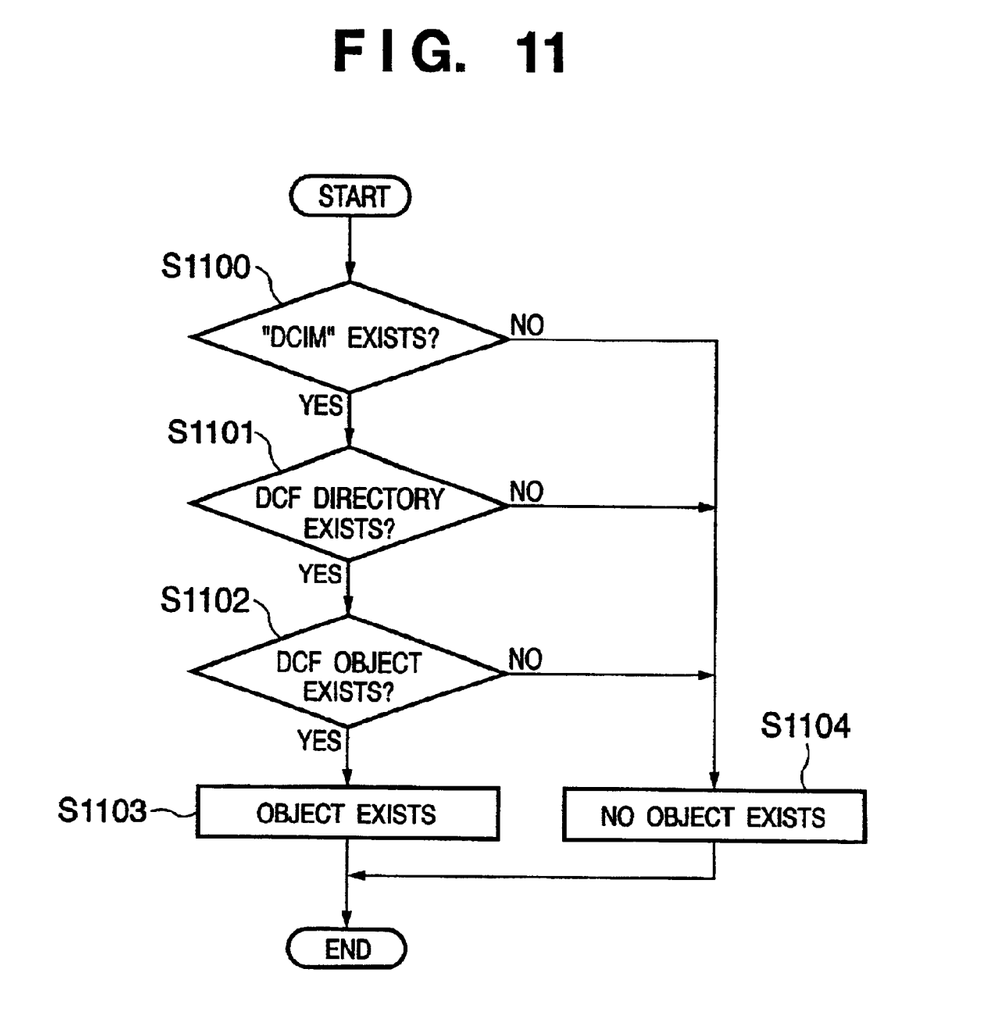
FIG. 11 is a flowchart showing processing of determining whether or not binary data is stored on the memory card.

First, at step S1001, it is determined whether or not still image data is stored on the inserted PC card. In the present embodiment, the determination is made by using the DCF file format. FIG. 11 is a flowchart showing processing of determining whether or not binary data is stored on the memory card.

First, at step S1100, a search is performed for the fixed DCF image root directory. If it is determined that this directory does not exist, the process proceeds to step S1104, at which it is determined that there is no object, and the process ends. On the other hand, if the DCF image root directory is found, a search is performed on the DCF directory immediately below the DCF image root directory at step S1101. As in the case of step S1100, if it is determined that this directory does not exist, the process proceeds to step S1104, at which it is determined that there is no object. If the DCF directory is found, the process proceeds to step S1102, at which it is determined whether or not the DCF object(s) exists. If the DCF object(s) exists, the process proceeds to step S1103, at which it is determined that object(s) exists. If it is determined at step S1102 that no DCF object exists, the process proceeds to step S1104 at which it is determined that no object exists. Since the determination here is merely determining whether object(s) exists or not, the number of DCF objects is not determined.

As described above, it is determined whether or not a DCF object i.e. binary data exists in the DCF file format, and if it is determined that no DCF object exists, the process proceeds to step S1002. At step S1002, the meta data registration processing shown in FIG. 4 is started, and the meta data is registered onto the memory card. Note that if meta data has been registered at this time, the contents of setting are displayed in the respective display input fields in the GUI image in FIG. 3, thereby the set meta data can be held or updated. Further, the determination as to whether or not meta data has been registered may be made by using processing at step S1003 to be described later.

On the other hand, if it is determined at step S1001 that binary data exists on the memory card, the process proceeds to step S1003. As 4 files (binary data) exist in the data structure shown in FIG. 9, the process proceeds from step S1001 to step S1003.

At step S1003, it is determined whether or not meta data is registered on the memory card. If it is determined that meta data is registered, the process proceeds to step S1004, at which the addition of meta data to binary data as shown in FIG. 8 is performed. On the other hand, if it is determined at step S1003 that no meta data is registered on the memory card, the process proceeds to step S1005, at which the registration of meta data as shown in FIG. 4 is performed. Then the process proceeds to step S1004, at which the registered meta data is added to the binary data. When the processing up to this point has been completed, the process proceeds to step S1006, at which the PC card is ejected, and the present process ends. Note that as the meta data, CardInfo.xml may be provided in parallel to the DCIM 901 in FIG. 9, accordingly, the determination as to whether or not meta data is registered may be made by searching for this CardInfo.xml.

Note that in a case where the meta data registration processing shown in FIG. 4 is performed at step S1005 and the meta data addition processing is performed at step S1004, the meta data is written onto the memory card then it is read to the RAM 106 and is deleted from the memory card. This process may be omitted. That is, it may be arranged such that in the registration processing in FIG. 4, the process proceeds to step S1004 in a status where the meta data is held in the RAM 106 while the final writing of the meta data onto the memory card (S405) is not performed. In this case, the meta data reading processing (step S801 in FIG. 8) in the meta data addition processing can be omitted.

Figure 12:
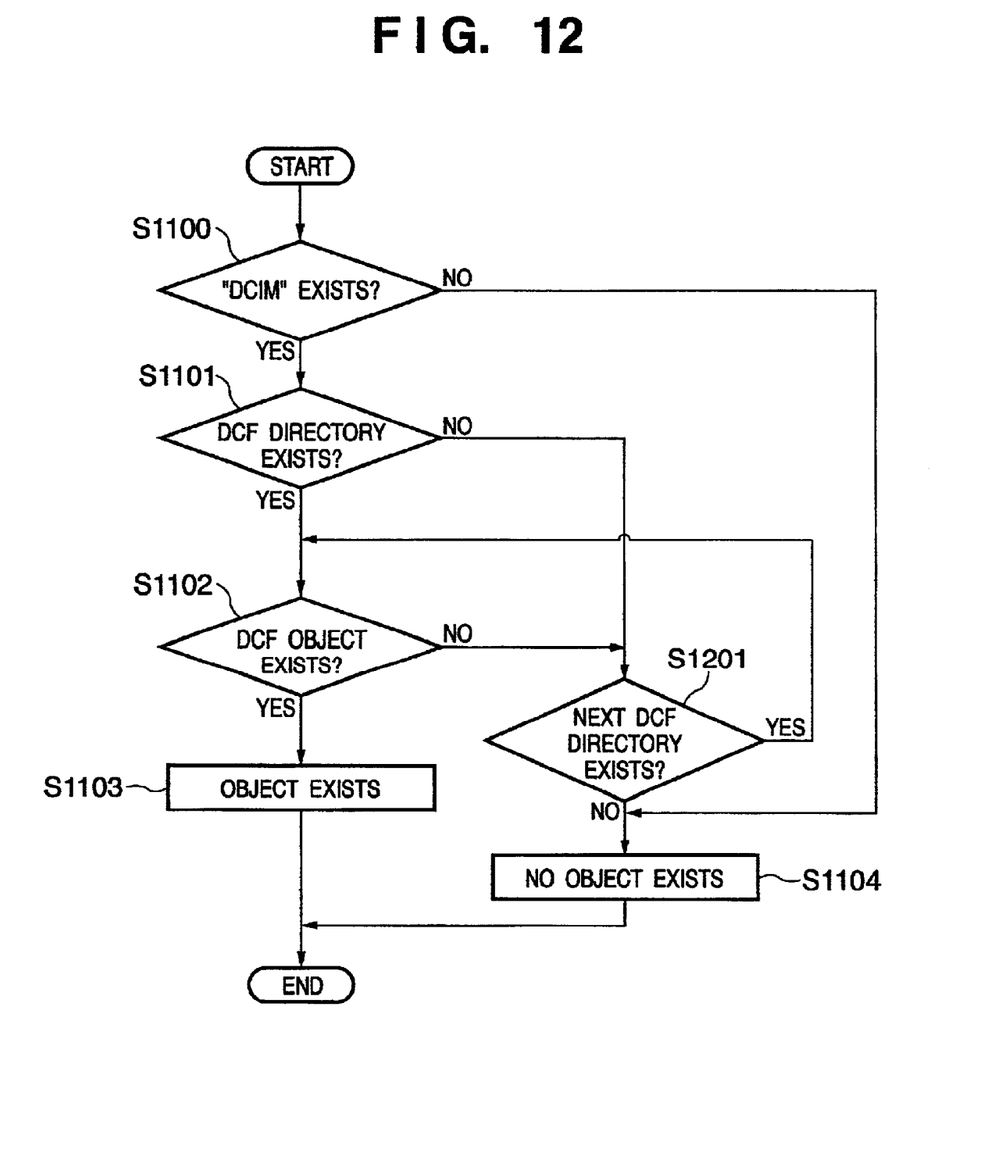
FIG. 12 is a flowchart showing processing of determining whether or not the binary data is stored on the memory card in a case where plural DCF directories exist.

Further, in the object search in FIG. 11, only one DCF directory 902 exists, however, in case of DCF file format, plural DCF directories 902 may be stored below the DCF image root directory 901. FIG. 12 shows the object search processing in this case. Note that in FIG. 12, steps which perform the same processing in FIG. 11 have the same step numbers.

According to the processing in FIG. 12, if it is determined at step S1101 that no DCF directory exists or it is determined at step S1102 that no DCF object exists, it is determined whether or not the next (unsearched) DCF directory exists at step S1201. Then if it is determined that the next DCF directory exists, the process returns to step S1102, at which a search is performed on the next DCF directory for DCF object. If it is determined at step S1201 that there is no next DCF directory, the process proceeds to step S1104, at which it is determined that there is no object, and the present process ends. By this processing, a search is performed on all the stored DCF directories, to determine whether or not at least one DCF object is stored in each DCF directory.

The processing in use of DCF file format is as described above. Even in a case where this fixed format directory structure is not employed, the above processing can be performed. For example, a search is performed on all the directories in the inserted PC card for a file recognized as binary data, e.g., a JPEG file if data is still image data, or an MPEG file if data is moving image data, to determine at least one binary data exists. Further, the type of file is discriminated by using a file extension such as .jpg or .mpg. Further, if the processing is performed on all the arbitrary directories, the processing can be easily realized by using a function to obtain directory information such as opendir() in case of UNIX.

Further, in the above embodiment, XML is used as a meta data description language, however, the data description language is not limited to XML but other data description languages such as SGML, HTML and the like may be used.

Further, in the above embodiment, the PC card and the like are used as a removable storage medium accessible by the data input/output device 100, however, the present invention is not limited to these cards. For example, the embodiment is applicable to other removable storage media such as a compact flash, a smart medium and a memory stick.

As described above, according to the embodiment, since the processing when a memory card is attached is automatically selected based on the presence/absence of binary data on the memory card, key-input or GUI menu selection by the user can be omitted. For example, if binary data and meta data are stored in the memory card, the meta data is automatically added to the binary data in accordance with insertion of the memory card. Thus the operation is automated. Further, in a case where binary data is stored but meta data is not stored, first, the meta data registration processing is started, and when the registration processing is completed, the addition processing is started. Further, in a case where binary data and meta data are not registered, the meta data registration processing is automatically started. Further, as one meta data can be automatically added to plural binary data, meta data can be registered for a large number of binary data by merely inputting the meta data once.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium holding software program code for performing the aforesaid functions of the above-described embodiment to a system or an apparatus, reading the program code with a computer (e.g., CPU, MPU) of the system or apparatus from the storage medium, then executing the program.

In this case, the program code read from the storage medium realizes the functions according to the embodiment, and the storage medium storing the program code constitutes the invention.

Further, the storage medium, such as a floppy disk, a hard disk, an optical disk, a magneto-optical disk, a CD-ROM, a CD-R, a DVD, a magnetic tape, a non-volatile type memory card, and ROM can be used for providing the program code.

Furthermore, besides aforesaid functions according to the above embodiment are realized by executing the program code which is read by a computer, the present invention includes a case where an OS (operating system) or the like working on the computer performs a part or entire actual processing in accordance with designations of the program code and realizes functions according to the above embodiment.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiment.

Note that in the above embodiment, the insertion of card triggers the automatic determination of presence/absence of binary data, the meta data addition processing and the meta data registration processing, however, another operation input may trigger these processings. Further, in the processing shown in FIG. 10, the card is finally ejected (step S1006), however, the process may move to another processing e.g. to browse stored images.

As described above, according to the present invention, it is possible to easily input meta data and add the meta data to binary data.

Further, according to the present invention, it is possible to register meta data for many binary data merely by inputting meta data once.

Further, according to the present invention, upon addition of meta data to binary data, a user's operation procedure is simplified.

As many apparently widely different embodiments of the present invention can be made without departing from the spirit and scope thereof, it is to be understood that the invention is not limited to the specific embodiments thereof except as defined in the appended claims.

What is claimed is:

1. A data processing apparatus comprising:

connection means for connection with a storage device removable from said apparatus;

determination means for, if the storage device is accessible by said connection means, determining whether or not a binary data file and a meta data file are stored in the same storage device;

registration means for, if said determination means determines that the meta data file is not stored, causing to be displayed a meta data input window for registering meta data of a new meta data file in the same storage device; and addition means for, if said determination means determines that both the binary data file and the meta data file are stored in the same storage device, adding meta data of the meta data file to the binary data file without said registration means causing the the meta data input window to be displayed.

2. A data processing method in a data processing apparatus having a connection means for connection with a storage device, removable from said apparatus, said method comprising:

a determination step of, if the storage device is accessible by said connection means, determining whether or not a binary data file and a meta data file are stored in the same storage device;

a registration step of, if it is determined at said determination step that the meta data file is not stored, starting to display a meta data input window for registering meta data of a new meta data file in the same storage device; and an addition step of, if it is determined at said determination step that the binary data file and the meta data file are stored in the same storage device, adding meta data of the meta data file to the binary data without said registration step causing the meta data input window to be displayed.

3. The data processing method according to claim 2, wherein said meta data is described in a data description language.

4. The data processing method according to claim 3, wherein said data description language is any one of XML, SGML and HTML.

5. The data processing method according to claim 2, wherein said binary data is any one of moving image data, still image data and audio data.

6. The data processing method according to claim 2, wherein at said determination step, it is determined whether or not a DCF (Design rule for Camera File System) object file defined by DCF format exists in said storage device.

7. The data processing method according to claim 2, wherein at said determination step, a search is performed on all the directories formed in said storage device, and it is determined whether or not a binary data file which can be handled at said addition step exists.

8. The data processing method according to claim 2, wherein at said addition step, the meta data is added to the end of the binary data.

9. A storage medium holding a control program for realizing the data processing method according to claim 2 by a computer.

* * * * *